United States Patent [19]

Gough

[11] 4,342,875
[45] Aug. 3, 1982

[54] METHOXY CARBOXYLIC ACID ESTERS AND USE AS ULTRAVIOLET STABILIZERS

[75] Inventor: Robert G. Gough, Cincinnati, Ohio

[73] Assignee: Cincinnati-Milacron, Inc., Cincinnati, Ohio

[21] Appl. No.: 431,965

[22] Filed: Jan. 9, 1974

Related U.S. Application Data

[62] Division of Ser. No. 297,446, Oct. 13, 1972, Pat. No. 3,814,729.

[51] Int. Cl.³ .............................................. C07C 69/76
[52] U.S. Cl. .................................. 560/64; 260/410.5; 560/73; 564/170; 564/176; 549/362; 549/417; 549/418; 549/436
[58] Field of Search ............. 260/473 R, 340.3, 340.5, 260/345.8 R, 410.5; 560/64, 73; 564/184, 170, 176

[56] References Cited

U.S. PATENT DOCUMENTS

| | | | |
|---|---|---|---|
| 2,198,583 | 4/1940 | Grether et al. | |
| 2,928,845 | 3/1960 | Shapiro et al. | |
| 3,022,268 | 2/1962 | Armitage et al. | 260/45.85 R |
| 3,206,431 | 9/1965 | Doyle et al. | 260/45.85 |
| 3,274,170 | 9/1966 | Ugi et al. | 564/184 |
| 3,288,855 | 11/1966 | Dexter et al. | 260/473 |
| 3,410,841 | 11/1968 | Armento et al. | 564/184 |
| 3,639,447 | 2/1972 | Taylor et al. | |
| 4,025,487 | 5/1977 | Dexter et al. | 564/184 |

FOREIGN PATENT DOCUMENTS

| | | | |
|---|---|---|---|
| 1936280 | 1/1970 | Fed. Rep. of Germany | |
| 370459 | 4/1932 | United Kingdom | 564/184 |

OTHER PUBLICATIONS

Lundt, I, et al., Acta Chemica Seand., 26 (1972), 1938-1946.
Chem. Abst. 47:2922g, 1953.

Primary Examiner—Paul J. Killos
Attorney, Agent, or Firm—Cushman, Darby & Cushman

[57] ABSTRACT

Compounds of the formula

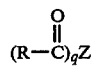

are prepared and are used as ultraviolet light and weathering stabilizers for polymers, preferably polypropylene. In the formula R is alkoxyphenyl, dialkoxyphenyl or alkylene dioxyphenyl, the alkoxy groups have 1 to 8 carbon atoms and the alkylene group has 1 to 4 carbon atoms, q is 1 to 6, and Z is

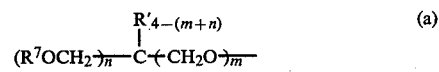

(a)

where R' is H or a 1 to 4 carbon alkyl, $R^7$ is hydrogen or

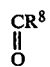

where $R^8$ is hydrocarbyl, m is 1 to 4, n is 0 or 1 and m+n is 1 to 4;

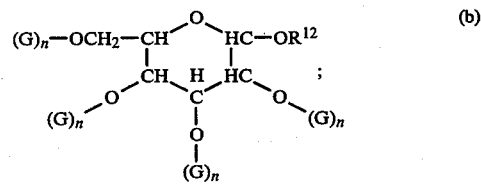

(b)

where $R^{12}$ is lower alkyl and G is H or

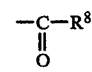

and where at least one of the n's is zero.

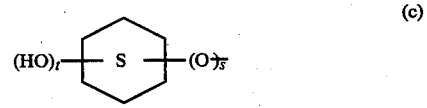

(c)

where s is 1 to 3 and t is from 0 to 2, the total of s and t being not over 3;

$$-O(CH_2)_uO-$$ (d)

where u is 2 to 4;

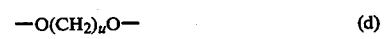

(e)

where v and w are each 1 to 4 and p is 2 to 4;

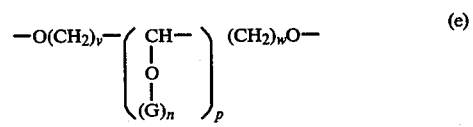

(f)

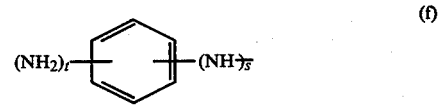

(g)

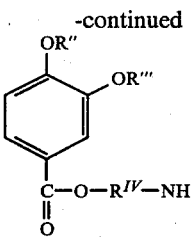 (h)

where R″ and R‴ are 1 to 8 carbon atom alkyl or where $R^{11}$ and $R^{111}$ together with the oxygen atoms attached thereto and the adjacent carbon atoms of the benzene ring form a 5 or 6 membered heterocyclic ring and $R^{IV}$ is 1 to 4 carbon atom alkylene;

 (i)

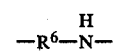

where x is 2 to 3;

(j) alkloxy of 1 to 18 carbon atoms;
(k) $NHR^9$ where $R^9$ is 1 to 18 carbon atom alkyl or H;

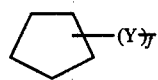 (l)

where Y is $-O-$, $-R^6-O-$ where $R^6$ is 1 to 3 carbon atoms $$-\overset{H}{N}-,$$

or $$-R^6-\overset{H}{N}-$$

and f is 2 to 4.

40 Claims, No Drawings

METHOXY CARBOXYLIC ACID ESTERS AND USE AS ULTRAVIOLET STABILIZERS

This is a division of application Ser. No. 297,446 filed Oct. 13, 1972 now U.S. Pat. No. 3,814,129, issued June 4, 1974.

The present invention relates to compounds useful as stabilizers for polymers. They are particularly useful in stabilizing olefin polymers, especially propylene polymers against degradation resulting from exposure to ultraviolet radiation and/or weathering conditions.

It is well known that many organic polymeric materials undergo deterioration upon exposure to ultraviolet radiation. Light having wavelengths in the region 290–400 nanometers causes photocatalyzed changes, such as yellowing or embrittlement, in unstabilized polymers. To overcome this problem it is usually necessary to stabilize the polymeric materials if they are to be formed into objects which will be subjected to sunlight or ultraviolet radiation, during use. Normally this stabilization is achieved by incorporation of chemical compounds as additives into the polymeric material.

It is, therefore, an object of the present invention to provide polymeric compositions which contain esters or amides of various alkoxy and dialkoxybenzoic acids with alcohols, preferably polyfunctional alcohols, or polyfunctional amines and which are substantially resistant to ultraviolet deterioration.

Another object is to prepare polymeric compositions which are more resistant to weathering conditions.

A more specific object is to stabilize polypropylene and other propylene containing polymers against degradation due to exposure to ultraviolet light and/or weathering.

Other objects will become apparent hereinafter.

In accordance with the present invention, it has been discovered that a substantial increase in resistance to ultraviolet light deterioration and weathering conditions of polymers, especially polypropylene are obtained when there is incorporated into the polymer composition esters or amides of the formula

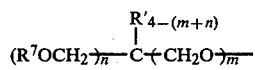

In the formula R is alkoxyphenyl, dialkoxyphenyl or alkylene dioxyphenyl, the alkoxy groups have 1 to 8 carbon atoms, and the alkylene group has 1 to 4 carbon atoms, q is 1 to 6, Z is

 (a)

where R' is H or a 1 to 4 carbon alkyl, R$^7$ is hydrogen or

where R$^8$ is hydrocarbyl, m is 1 to 4, n is 0 or 1 and m+n is 1 to 4;

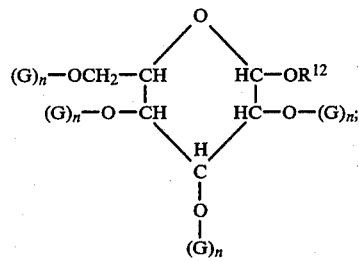 (b)

where R$^{12}$ is lower alkyl and G is H or

and where at least one of the n's is zero.

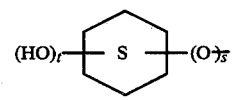 (c)

where s is 1 to 3 and t is from 0 to 2, the total of s and t being not over 3;

 (d)

where u is 2 to 4;

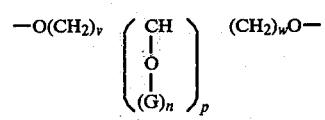 (e)

where v and w are each 1 to 4 and p is 2 to 4;

 (f)

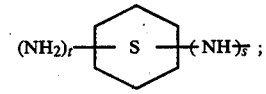 (g)

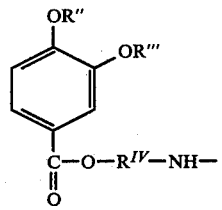 (h)

where R" and R'" are 1 to 8 carbon atom alkyl or where R$^{11}$ and R$^{111}$ together with the oxygen atoms attached thereto and the adjacent carbon atoms of the benzene ring form a 5 or 6 membered heterocyclic ring and R$^{IV}$ is 1 to 4 carbon atom alkylene;

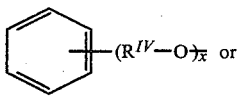

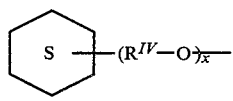

where x is 2 to 3;
(j) alkoxy of 1 to 18 carbon atoms;
(k) $NHR^9$ where $R^9$ is 1 to 18 carbon atom alkyl or H;

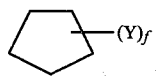

where Y is

where $R^6$ is 1 to 3 carbon atoms,

or

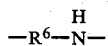

and f is 2 to 4.

Preferably the esters are esters of pentaerythritol. R is preferably dialkoxyphenyl, more preferably dimethoxyphenyl, most preferably 3,4-dimethoxyphenyl.

Among the compounds employed in the invention are the following when Z is (a): pentaerythritol tetra (3,4-dimethoxybenzoate) (pentaerythritol tetra veratrate), pentaerythritol tetra (2,4-dimethoxy benzoate), pentaerythritol tetra (3,5-dimethoxybenzoate), pentaerythritol tetra (3-methoxy-4-butoxybenzoate), pentaerythritol tetra (3-methoxy-4-octoxybenzoate), pentaerythritol tetra (3-methoxy-5-octoxybenzoate), pentaerythritol tetra (2-methoxy-4-isopropoxybenzoate), pentaerythritol tetra (3,4-diethoxybenzoate), pentaerythritol tetra (3,4-dioctoxy benzoate), pentaerythritol monostearate tris (3,4-dimethoxybenzoate), pentaerythritol monostearate tris (2,4-dimethoxybenzoate), pentaerythritol monostearate tris (3,5-dimethoxybenzoate), pentaerythritol monostearate tris (3-methoxy-4-pentoxybenzoate), pentaerythritol monobenzoate tris (3,4-dimethoxybenzoate), pentaerythritol monooleate tris (3,4-dimethoxybenzoate), pentaerythritol monoacetate tris (3,4-dimethoxybenzoate), pentaerythritol monolaurate tris (2,4-dimethoxybenzoate), pentaerythritol monopalmitate tris (3,5-dimethoxybenzoate), pentaerythritol tris (3,4-dimethoxybenzoate), pentaerythritol monohexanoate bis (3,5-dimethoxybenzoate), pentaerythritol propionate tris (3,4-dimethoxybenzoate), pentaerythritol tetra (4-methoxybenzoate), pentaerythritol tetra (4-ethoxybenzoate), pentaerythritol tetra (4-octoxybenzoate), pentaerythritol tetra (3-methoxybenzoate), pentaerythritol tetra (2-methoxybenzoate), pentaerythritol tris (4-methoxybenzoate), pentaerythritol monostearate tris (3-butoxybenzoate), pentaerythritol monomyristate tris (2-methoxybenzoate), pentaerythritol tetra (2,3-methylenedioxybenzoate), pentaerythritol (3,4-methylenedioxybenzoate), pentaerythritol (3,4-ethylenedioxybenzoate), 1,1,1-trimethylol propane tris (3,4-methylenedioxybenzoate), 1,1,1-trimethylolethane tris (3,4-methylenedioxybenzoate), 1,1,1-trimethylolbutane tris (3,4-dimethoxybenzoate), 1,1,1-trimethylolethane tris (3,4-dimethoxybenzoate), 1,1,1-trimethylolpropane tris (3,4-dimethoxybenzoate), 1,1,1-trimethylol propane tris (3,5-dimethoxybenzoate), 1,1,1-trimethylol ethane tris (2,4-dimethoxybenzoate), 1,1,1-trimethylol ethane tris (3-methoxy-4-hexoxybenzoate), 1,1,1-trimethylolpropane tris (4-methoxybenzoate), 1,1,1-trimethylolpropane monostearate bis (3,4-dimethoxybenzoate), 1,1,1-trimethylolethane bis (3,4-dimethoxybenzoate), glycerol tris (3,4-dimethoxybenzoate);

when Z is (b):
methyl-alpha-D-glucoside tetra (3,4-dimethoxybenzoate), methyl-beta-D-glucoside tetra (3,4-dimethoxybenzoate), methyl-alpha-D-glucoside tri (3,4-dimethoxybenzoate), methyl-alpha-D-glucoside tetra (3,5-dimethoxybenzoate), methyl-alpha-D-glucoside tetra (3-methoxy-4-octoxybenzoate), methyl-alpha-D-glucoside tetra (2,4-dimethoxybenzoate), methyl-alpha-D-glucoside tetra (4-methoxybenzoate), methyl-alpha-D-glucoside tetra (3-methoxybenzoate), methyl-alpha-D-glucoside tetra (2-methoxybenzoate), methyl-alpha-D-glucoside tetra (3,4-methylenedioxybenzoate), methyl-alpha-D-glucoside tetra (3,4-ethylenedioxybenzoate), methyl-alpha-D-glucoside monoacetate tris (3,4-dimethoxybenzoate), methyl-alpha-D-glucoside tetra (2,4-diethoxybenzoate), ethyl-alpha-D-glucoside tetra (3,4-dimethoxy benzoate), propyl-alpha-D glucoside tetra (2-methoxy-4-octoxy benzoate), butyl-alpha-D, glucoside tetra (3,4-dimethoxy benzoate), when Z is (c):
1,2-cylohexanediol di (3,4-dimethoxybenzoate)

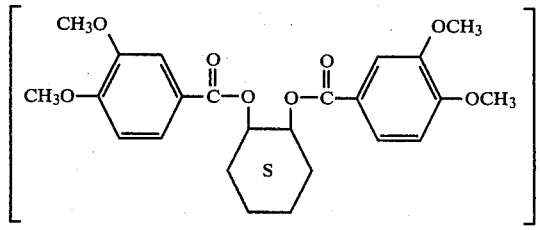

1,2-cyclohexanediol di(3,5-dimethoxybenzoate), 1,2-cyclohexanediol di (2,4-dimethoxybenzoate), 1,2-cyclohexanediol di (2-methoxybenzoate), 1,2-cyclohexanediol di (3-methoxybenzoate), 1,2-cyclohexanediol di (4-methoxybenzoate), 1,2-cyclohexanediol di (2,3-methylenedioxybenzoate), 1,2-cyclohexanediol di (3,4-methylenedioxybenzoate), 1,2-cyclohexandiol di (3,4-ethylenedioxybenzoate), 1,3-cyclohexanediol di (3,4-dimethoxybenzoate), 1,4-cyclohexanediol di (3,4-dimethoxybenzoate), 1,2,4-cyclohexanetriol tri (3,4-dimethoxybenzoate), 1,2,4-cyclohexanetriol mono (3,4-dimethoxybenzoate), 1,2,4-cyclohexanetriol di (3,4-dimethoxybenzoate), 1,2-cyclohexanediol di (3-methoxy-4-butoxybenzoate);

when Z is (d):

ethylene glycol di (3,4-dimethyoxybenzoate), ethylene glycol di (2,4-dimethoxybenzoate), ethyleneglycol di (3,5-dimethoxybenzoate), ethylene glycol di (4-methoxybenzoate), ethylene glycol di (2-methoxybenzoate), ethylene glycol di (3-methoxy-4-octoxy-benzoate), ethylene glycol di (2,3-methylene dioxybenzoate), ethylene glycol di (3,4-methylene dioxybenzoate), propylene glycol di (3,4-dimethoxybenzoate), propylene glycol di (2-methoxybenzoate), propylene glycol di (3,4-methylenedioxybenzoate), trimethylene glycol di (3,4-dimethoxybenzoate), ethylene glycol di (3-methoxy-4-octoxy-benzoate), hexamethylene glycol di (3,4-dimethoxybenzoate);

when Z is (e):
mannitol hexa (3,4-dimethoxy benzoate), mannitol penta (3,4-dimethoxy benzoate), sorbitol hexa (3,4-dimethoxy benzoate), sorbitol penta (3,4-dimethoxy benzoate), rhamnitol penta (3,4-dimethoxy benzoate), arabitol penta (3,4-dimethoxy benzoate), xylitol penta (3,4-dimethoxy benzoate), mannitol monostearate penta (3,4-dimethoxy benzoate), and sorbitol hexa (4-methoxy benzoate). 1,2,6-hexanetriol tris (3,5-dimethoxybenzoate), 1,2,6-hexantriol tris (3,4-dimethoxybenzoate), 1,2,6-hexanetroil tris (4-methoxybenzoate);

when Z is (f):
1,2-bis (3,4-dimethoxybenzamido)benzene,

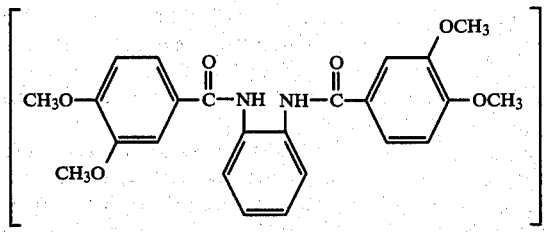

1,2-bis (3,5-dimethoxybenzamido) benzene, 1,2-bis (2,4-dimethoxybenzamido) benzene, 1,2-bis (4-methoxybenzamido) benzene, 1,2 bis (3-methoxybenzamido)benzene, 1,2-bis (2-methoxybenzamido) benzene, 1,2-bis (3,4-methylenedioxybenzamido)benzene, 1,2-bis (3-methoxy-4-octoxy-benzamido) benzene, 1,2-4-tris, (3,4-dimethoxybenzamido) benzene, 3,5-dimethoxybenzamido-benzene, 3,4-dimethoxybenzamido benzene, 4-methoxybenzamido benzene, 2-methoxybenzamido benzene:

when Z is (g):
1,2-bis (3,4-dimethoxybenzamido) cyclohexane [N,N'-(3,4-dimethoxybenzoyl)-1,2-cyclohexanedimaine], 1,2-bis (3,5-dimethoxybenzamido) cyclohexane, 1,2-bis (2,4-dimethoxybenzamido) cyclohexane, 1,2-bis (4-methoxybenzamido) cyclohexane, 1,2-bis (3-methoxybenzamido) cyclohexane, 1,2-bis (2-methoxybenzamido) cyclohexane, 1,2-bis (3,4-methylenedioxybenzamido) cyclohexane, 1,2-bis (3-methoxy-4-octoxybenzamido) cyclohexane, 1,2,4-tris (3,4-dimethoxybenzamido) cyclohexane, 3,5-dimethoxybenzamido cyclohexane, 3,4-dimethoxybenzamido cyclohexane, 2-methoxybenzamido cyclohexane;

when Z is (h):
beta-(3,4-dimethoxybenzamido)ethyl veratrate

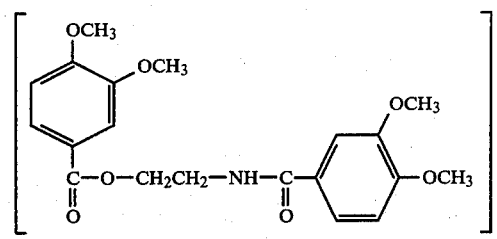

3,4-dimethoxybenzamido methyl veratrate, gamma-(3,4-dimethoxybenzamido) propyl veratrate, delta-(3,4-dimethoxybenzamido) butyl veratrate, beta-3-methoxybenzamidoethyl veratrate, beta-(3-methoxy-4-octoxybenzamido)ethyl veratrate, beta-(3,4-dimethoxybenzamido) ethyl-3-methoxy-4-octoxybenzoate;

when Z is (i):
1,2-xylylene glycol di (3,4-dimethoxybenzoate), 1,2-xylylene glycol di (3,5-dimethoxybenzoate), 1,2-xylene glycol di (2,4-dimethoxybenzoate), 1,2-xylylene glycol di (2-methoxybenzoate), 1,2-xylylene glycol di (3-methoxy-4-octoxybenzoate), 1,2-xylylene glycol di (3,4-methylenedioxybenzoate), 1,4-xylene glycol di (3,4-dimethoxybenzoate), 1,3-xylylene glycol di (3,4-dimethoxybenzoate), 1,2-benzeneditetramethylene glycol bis (3,4-dimethoxybenzoate), 1,2-cyclohexanedimethanol bis (3,4-dimethoxybenzoate), 1,2-cyclohexanedimethanol bis (4-ethoxybenzoate), 1,2-cyclohexanedimethanol-bis(3,4-methylenedioxybenzoate), 1,4-cyclohexanedimethanol-bis-(3,4-dimethoxybenzoate), 1,2,4-benzenetrimethanol-tris(3,4-dimethoxybenzoate);

when Z is (j):
methyl veratrate, ethyl veratrate, propyl veratrate, butyl veratrate, t-butyl veratrate, octyl veratrate, decyl veratrate, octadecyl veratrate, methyl 2,4-dimethoxybenzoate, ethyl 2,4-dimethoxybenzoate, butyl 2,4-dimethoxybenzoate, methyl 3,5-dimethoxybenzoate, methyl 4-methoxybenzoate, propyl 2-methoxybenzoate, octyl-3-methoxybenzoate, methyl-4-octoxybenzoate, ethyl 3-methoxy-4-octoxybenzoate;

when Z is (k):
3,4-dimethoxybenzamide, N-methyl-3,4-dimethoxybenzamide, N-octyl-3,4-dimethoxybenzamide, N-octadecyl-3,4-dimethoxybenzamide, N-ethyl-3,5-di-methoxybenzamide, N-propyl-2,4-dimethoxybenzamide, N-methyl-3-methoxy-4-octoxybenzamide, N-hexyl-4-methoxy-benzamide, N-octyl-2-methoxybenzamide, N-methyl-3,4-methylenedioxybenzamide; and when Z is (l)
1,2-cyclopentanediol diveratrate, 1,2-cyclopentanediol di(2,4-dimethoxybenzoate), 1,2-cyclopentanediol di (3,4-methylenedioxybenzoate), 1,2-cyclopentanediol di (3-methoxy-4-octoxybenzoate), 1,3-cyclopentanediol diveratrate, 1,2-cyclopentanediol di (4-methoxybenzoate), 1,2-cyclopentanedimethanol di (3,4-dimethoxybenzoate), 1,2-cyclopentanedipropanol di (2,4-dimethoxybenzoate), 1,2,4-cyclopentanetriol triveratrate, N,N'-bis (3,4-dimethoxybenzoyl)-1,2-cyclopentanediamine, N,N'-bis (3,5-dimethoxybenzoyl)-1,2-cyclopentane diamine, N,N'-bis (3-methoxy-4-octoxy-benzoyl)-1,2-cyclopentane diamine, N,N'- bis (3-methoxybenzoyl)-1,2-cyclopentane diamine, N,N'-bis (3,4-methylenedioxybenzoyl)-1,2-cyclopentane diamine, N,N',N"-tris (3,4-dimethoxybenzoyl)-1,2,4-cyclopentane triamine, N,N'-bis (3,4-dimethoxybenzoyl)-1,2-bis amiomethyl cyclopentane;

The compounds of the present invention within formulas (a) through (l) above can be prepared in conventional manner. Thus, the esters can be prepared by reacting stoichiometric amounts of an acyl chloride (or bromide) of the formula

where Hal is chlorine or bromine with the appropriate monohydric or polyhydric alcohol or phenol, e.g., pentaerythritol, methyl-alpha-D-glucose, 1,2,6-hexanetriol, ethylene glycol, propylene glycol, mannitol, sorbitol, rhamnitol, arabitol, xylitol, hexamethylene glycol, 1, 1, 1-trimethylelethane or 1, 1, 1-trimethylol propan, methyl alcohol, t-butyl alcohol, octyl alcohol, octadecyl alcohol, 1,2-cyclohexanediol, resorcinol, hydroquinone, xylylene glycol, 1,2-cyclopentanediol. Similarly the amides, can be prepared in conventional fashion by reacting stoichiometric amounts of an acyl chloride (or bromide) of the formula

with a mono or polyamine such as 1,2-phenylene diamine, 1,4-phenylene diamine, 1,2-xylylene diamine, 1,2-cyclohexanediamine, 1,4-cyclohexanediamine, 1,2,4-benzene-triamine, methylamine, octylamine, ethylamine.

In making the esters and amides in place of the acyl halides there can be used the corresponding acids and salts, e.g., veratric acid and sodium veratrate.

Beta (3,4-dimethoxybenzamido) ethyl veratrate is made by reacting stoichiometric amounts of hydroxyethylamine and veratroylchloride in a conventional manner.

The compounds of the invention are compatible with olefin polymers and significantly stabilize olefin polymers against the deteriorating effects of ultraviolet light without causing undesirable discoloration of the polymers.

While not being limited by theory it is believed that the present compounds work on a different principle. Ultraviolet stabilizers previously known in the art are commonly believed to function by intramolecular photoisomerizations which are reversible, or by quenching electronically exicted chromophores in the polymer substrate. It is generally know that certain molecules when electronically excited can be deactivated or quenched by other molecules and in some cases there is no net chemical change in either quencher or quenchee. Further it is known that the quenching process requires the quenchee and quencher to collide or at least be less than 100 A apart. We believe the compounds disclosed in this application function as ultraviolet stabilizers because they contain ultraviolet absorbing groups (quenchees) which are held in close proximity to quenching groups so that collision or very close approach between quencher and quenchee can occur almost instantaneously after electronic excitation.

The quencher and quenchee are held in close proximity by means of chemical bonds or by attractive forces such as hydrogen-bonding, dipole-dipole interaction, or electrostatic attraction.

This mechanism as stated is different than that of normal stabilization. The effect of the use of the compounds of the invention is to inhibit polymer degradation because it takes the energy first before it attacks the polymer molecule.

While the ultraviolet light stabilizers of the present invention are most useful as ultraviolet light stabilizers for polypropylene and propylene copolymers with other hydrocarbons their utility is not limited thereto.

The ultraviolet light stabilizers of the present invention are particularly effective with solid polyethylene, polypropylene, ethylene propylene copolymers (e.g., 50:50, 80:20 and 20:80), ethylene - monoolefin copolymers wherein the monoolefin has 4–10 carbon atoms and is present in a minor amount, e.g., ethylenebutene-1 copolymer (95:5) and ethylene - decene - 1 copolymer (90:10). Furthermore, they can be used to stabilize natural rubber, styrene-butadiene rubber (SBR). e.g. (75% butadiene-25% styrene), EPDM rubbers, ABS terpolymers (e.g., 20–30% acrylonitrile, 20–30% butadiene, 40–60% styrene), polyisoprene, polybutadiene, butyl rubber, and butadiene-acrylonitrile (e.g., 60:40).

As the EPDM rubber there can be employed many of the commercially available EPDM rubbers. The EPDM rubber normally contains 30 to 70 molar percent (preferably 50 to 60 molar percent) of ethylene 65 to 20 molar percent (preferably 35 to 45 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims, the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,379, in British Pat. No. 880,904 and in Belgium Pat. No. 623,698.

There can be incorporated conventional phosphites in an amount of 0.1 to 10 parts per 1000 parts of polymer. Typical of such phosphites are triphenyl phosphite, tris decyl phosphite, decyl diphenyl phosphite, di(p-t-butylphenyl) phenyl phosphite, di-phenyl-o-cresyl phosphite, trioctyl phosphite, tricresyl phosphite, tri-benzyl phosphite, polymeric phosphites such as the one prepared from triphenyl phosphite and hydrogenated bisphenol A and having a molecular weight of about 3000 and (a linear polymeric pentaerythritol hydrogenated bisphenol A phosphite made in accordance with Patent 3,053,878, distearyl pentaerythritol diphosphite, thiophosphites such as trilauryl trithiophosphite, trioleyl trithiophosphite and tristearyl trithiophosphite.

There can also be included thio compounds conventionally employed in monoolefin polymers formulations, e.g., in an amount of 0.01 to 10%, usually 0.1 to 5% of the polymer. Thus, there can be used pentaerythritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methyl-mercapto propionic acid, lauryl ester of 3-butyl-mercapto propionic acid, lauryl ester of 3-laurylmercapto propionic acid, phenyl ester of 3-octylmercapto propionic acid, lauryl ester of 3-phenylmercapto propionic acid, lauryl ester of 3-benzyl-mercapto propionic acid, lauryl ester of 3-(p-methoxy)phenylmercapto propionic acid, lauryl ester of 3-cyclohexylmercapto propionic acid, lauryl ester of 3-hydroxymethylmercaptopropionic acid, octyl ester of 3-methoxymethylmercaptopropionic acid, dilauryl ester of 3-carboxylmethylmercapto propionic acid, dilauryl ester of 3-carboxypropylmercapto propionic acid, dilauryl-4,7-dithiosebacate, dilauryl-4,7,8,11-tetrathiotetradecandioate, dimyristyl-4,11-dithiotetradecandioate, lauryl-3-benzothiazylmercaptopropionate. Preferably the esterifying alcohol is an alkanol having 10 to 18 carbon atoms. Other esters of beta thiocarboxylic acids set forth in Gribbins U.S. Pat. No. 2,519,744 can also be used.

Likewise, there can be included 0.01-10%, usually 0.1-5% in the monoolefin polymer formulations polyvalent metal salts. Examples of such salts are calcium stearate, zinc caprylate, calcium 2-ethylhexoate, calcium octate, calcium oleate, calcium ricinoleate, calcium myristate, calcium palmitate, aluminum stearate, calcium laurate, barium laurate, barium stearate, magnesium stearate, as well as zinc stearate, cadmium laurate, cadmium octoate, cadmium stearate and the other polyvalent metal salts of fatty acids set forth previously.

There can also be added phenolic antioxidants in an amount of 0.01-10%, preferably 0.05-5%. Examples of such phenols include 2,6-di-t-butyl-p-cresol (Ionol), butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis (4-methyl-6-t-butylphenol) (Catalin 14), 2,6-butyl-4-decycloxyphenol, 2-t-butyl-4-dodecycloxyphenol, 2-t-butyl-4-dodecyloxyphenol, 2-t-butyl-4-octadecyloxyphenol, 4,4'-methylene-bis(2,6-di-t-butyl phenol), p-aminophenol, N-lauryloxy-p-amino-phenol, 4,4'-thiobis(3-methyl-6-t-butylphenol), bis [o-(1,1,3,3-tetramethylbutyl)phenol] sulfide, 4-acetyl-beta-resorcylic acid, A stage p-t-butylphenolformaldehyde resin, crotonaldehyde condensate of 3-methyl-6-t-butylphenol, 2,6-di-t-butyl p-cresol (Ionol), 2,2-methylene bis 4-ethyl-6-t-butylphenol (AO-425), 4-dodecyloxy-2-hydroxy-benzophenone, 3-hydroxy-4-(phenylcarbonyl) phenyl palmitate, n-dodecyl ester of 3-hydroxy-4-(phenylcarbonyl) phenoxyacetic acid, and t-butylphenol.

The use of epoxy compounds in an amount of 0.01-5% in the monoolefin and other polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorohydrinbisphenol A resins (epichlorohydrindiphenylolpropane resins), phenoxy-propylene oxide, butoxypropylene oxide, epoxidized neopentylene oleate, glycidyl epoxystearate, epoxidized alpha-olefins, epoxidized glycidyl soyate dicyclopentadiene dioxide, epoxidized butyl tallate, styrene oxide, dipentene dioxide, glycidol, vinyl cyclohexane dioxide, glycidyl ether of resorcinol, glycidol ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide; 2-ethyl-3-propyl glycidamide, glycidyl ethers of glycerine, pentaerythritol and sorbitol, and 3,4-epoxycyclohexane-1,1-dimethanol bis-9,10-epoxystearate.

The ultraviolet light stabilizer can be redily incorporated into the polymeric material by various standard procedures. In one technique, the dry stabilizer in powdered form is mixed with a powdered or granular plastic and the mixture is then appropriately treated by molding or extruding. In another procedure the ultraviolet stabilizer is dissolved in a suitable solvent and the solution is mechanically mixed with the powdered polymer in an open contaner. Mixing is continued until the solvent evaporates leaving a dry powder which can be molded or extruded by the usual methods.

Significant stabilization is achieved when the ultraviolet stabilizer is used at the one part per hundred resin level, although higher and lower levels are also effective, e.g., from 0.05-10%, usually 0.1-5%.

Unless otherwise indicated, all parts and percentages are by weight.

EXAMPLE I

Pentaerythritol Tetrakis (3,4-dimethoxybenzoate)

A mixture of 30.0 gms (0.15 mole) of 3,4-dimethoxybenzoyl chloride and 5.11 gms (0.0375 mole) of pentaerythritol was stirred at 100° C. and reduced pressure (15 mm Hg) for six hours. The product was a yellow, glassy material which was dissolved in benzenemethanol (1:1) and the solution was then refluxed for 20 minutes. Concentration gave a glassy residue which was crystallized by trituration with ethyl ether. Recrystallization from methanolbenzene (2:1.25) gave a white crystalline powder, mp 160°–162° C., 57% yield. The infrared spectrum was consistent with the structure of pentaerythritol tetrakis (3,4-dimethoxybenzoate) having no hydroxy band and an ester carbonyl band at 5.80μ. The proton magnetic resonance spectrum and carbon-hydrogen analysis agreed with the structure of the tetraester.

EXAMPLE II

Pentaerythritol Monostearate Tris(3,4-dimethoxybenzoate)

A mixture of 16.41 gms (0.0336 mole) of pentaerythritol monostearate and 20.8 gms (0.104 mole) of 3,4-dimethoxybenzoyl chloride was stirred at 100° C. and reduced pressure (15 mm Hg) for 5½ hours. The mixture was then stirred with methanol for 20 minutes. Removal of the methanol by means of rotary evaporation at reduced pressure gave a waxy product which melted near 35° C. and was slightly yellow.

The infrared spectrum was consistent with the structure of pentaerythritol monostearate tris (3,4-dimethoxybenzoate) with two strong carbonyl bands at 5.75 and 5.82μ. The proton magnetic resonance spectrum agreed with the structure:

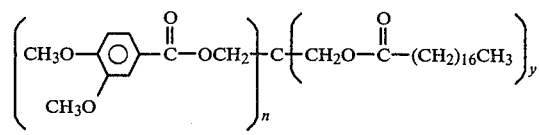

wherein n=2.6 and y=1.4.

EXAMPLE III

Methyl-α-D-glucoside Tetrakis(3,4-dimethoxybenzoate)

Using the same procedure as described in Example I, 3,4-dimethoxybenzoyl chloride was allowed to react with methyl-α-D-glucoside in the molar ratio of 4:1. The reaction was fast and exothermic and gave a 46% yield of a white crystalline compound mp 94°–96° C. The compound gave a negative Beilstein test for halogen and the infrared spectrum confirmed the product was the tetraester with no hydroxyl band and a carbonyl band at 5.85μ (s).

EXAMPLE IV

Pentaerythritol Tetrakis(2,4-dimethoxybenzoate)

Using the procedure of Eample I, 2,4-dimethoxybenzoyl chloride was allowed to react with pentaerythritol in the molar ratio of 4:1. The reaction gave a 78% yield of white crystalline product having a melting point of 125°–126.5° C. and the infrared spectrum was a consistent with the expected tetraester with no hydroxyl band and an ester carbonyl band at 5.85μ (s).

EXAMPLE V

Pentaerythritol Tetrakis(3,5-dimethoxybenzoate)

Following the procedure of Example I, 3,-5-dimethoxybenzoyl chloride was allowed to react with pentaerythritol in the molar ratio of 4:1. The reaction gave a 35% yield of purified white crystalline ester with a melting point of 101.5°–103.5° C. A Beilstein test showed the absence of halogen and the infrared spectrum was consistent with the expected tetraester having no hydroxyl band and an ester carbonyl band at 5.82μ (s). The proton magnetic resonance spectrum (pmr) confirmed the structure of the product.

EXAMPLE VI

1,2-Bis(3,4-dimethoxybenzamido) benzene

Stoichiometric amounts of 3,4-dimethoxybenzoyl chloride (0.10 moles) and o-phenylenediamine (0.05 moles) (molar ratio 2:1) were refluxed for three hours in benzene solution using a 50% excess of triethylamine (0.15 moles) as an acid acceptor. The reaction mixture was filtered and the filter cake stirred with water, washed, and dried. After drying in a warm vacuum oven over 2 hours the product was obtained as white crystals, mp 191°–192° C., 90% yield. The infrared was consistent with the expected diamide having amide bands at 3.04 (s,N-H) and 6.13 (s).

EXAMPLE VII

Pentaerythritol Tetrakis(3-methoxy-4-butoxybenzoate)

Following the procedure of Example I, 3-methoxy-4-butoxybenzoyl chloride was allowed to react with pentaerythritol in the molar ratio of 4:1. The tetraester was obtained in 80% yield as a white crystalline material, mp 48°–50° C., which gave a negative Beilstein test for halogen. The infrared spectrum is consistent with the expected tetraester with an ester band at 5.8μ. The proton magnetic resonance spectrum is also consistent with the title compound.

EXAMPLE VIII

Pentaerythritol Tetrakis(3-methoxy-4-octoxybenzoate)

The reaction of thionyl chloride with 3-methoxy-4-octoxybenzoic acid (molar ratio 1:1) gave the acid chloride in 93% yield distilled, bp 202° C. at 1 mm of Hg. The infrared spectrum showed the acid chloride carbonyl band at 5.7μ (s). The 3-methoxy-4-octoxybenzoyl chloride was allowed to react with pentaerythritol according to the procedure of Example I in a molar ratio of 4:1. The product was obtained in 90% yield as white crystals, mp 74°–76° C. The infrared spectrum showed an ester carbonyl at 5.8μ and the proton magnetic resonance spectrum was consistent with the title compound. Carbon and hydrogen analysis gave good agreement with the calculated values for the title compound.

EXAMPLE IX

1,1,1-Trimethylolethane Tris(3,4-dimethoxybenzoate)

Following the procedure of Example I, 3,4-dimethoxybenzoyl chloride was allowed to react with 1,1,1-trimethylolethane in the molar ratio of 3:1. The product was obtained in 90% yield as a glassy substance which slowly crystallized after being precipitated from methanol at dry-ice temperature. The triester is a white crystalline material, mp 105°–106° C., with an ester carbonyl band at 5.85μ. The proton magnetic resonance spectrum was consistent with the title compound.

EXAMPLE X

The products of Example I, pentaerythritol tetrakis (3,4-dimethoxybenzoate) and Example II, pentaerythritol monostearate tris(3,4-dimethoxybenzoate), were tested to determine their ability to stabilize polypropylene against ultraviolet light degradation. The ultraviolet stabilizer was dissolved in methylene chloride and stirred with powdered polypropylene in an open container. The mixture was stirred until all the solvent evaporated leaving a dry white powder which was compression molded into panels 0.0312" thick. The panels were then exposed to an unfiltered mercury arc lamp (medium pressure, 2537 A). The samples were tested for embrittlement by bending them 180° around a 0.200" radius of curvature. Fracture during bending was taken as failure. Results of the test are given in Table I.

TABLE I
STABILIZATION OF POLYPROPYLENE TO HIGH ENERGY (2537 A) ULTRAVIOLET LIGHT

| Ultraviolet Stabilizer | Conc. in phr | Hrs. to Embrittlement (Fracture) |
|---|---|---|
| Pentaerythritol tetrakis (3,4-dimethoxybenzoate) | 1.0 | 600 |
| Pentaerythritol monostearate tris(3,4-dimethoxybenzoate) | 1.0 | 48 |
| No Ultraviolet Stabilizer Added (Control) | 0.0 | 24 |

The polyethylene employed was Profax (6501) which has a reduced specific viscosity (RSV) of 3.0 and a melt index of 0.4 ASTM D 123857T at 190° C.

The term phr in the tables means parts of the additive per 100 parts of the resin.

Irganox as used in the tables is Irganox 1010 which is pentaerythritol tetrakis(3-(3,5-di-t-butyl-4-hydroxyphenyl)) propionate.

DISDAP as used in the tables is distearyl thiodipropionate.

PETV as used in the tables is an abbreviation for pentaerythritol tetrakis (3,4-dimethoxyenzoate).

EXAMPLE XI

The ultraviolet stabilizers described in Examples I and III through IX as well as several other stabilizers within the invention were tested to determine their ability to stabilize polypropylene against ultraviolet light degradation when exposed in a Weather-Ometer with a Sunshine carbon arc and Corex D filter. Results of the test are given in Table II. The polypropylene panels were prepared by dissolving the ultraviolet stabilizer in a suitable solvent such as methylene chloride and stirring with powdered polypropylene (Profax 6501) in an open container. The mixture was stirred until all the solvent evaporated leaving a dry white powder which was compression molded into panels 0.050" thick. The panels were then exposed in a Weather-Ometer. The panels were tested for embrittlement by bending them 180° around 3/16" diameter mandrel. Fracture during bending was taken as failure.

TABLE II
WEATHER-OMETER EVALUATION OF ULTRAVIOLET STABILIZERS IN POLYPROPYLENE PANELS

| | Ultraviolet Stabilizer | Conc. in phr | Hours to Failure | Color at Failure |
|---|---|---|---|---|
| 1. | None (control) | 0 | 75 | sl. yellow |
| 2. | Pentaerythritol tetrakis(3,4-dimethoxybenzoate) | 1 | 200 | sl. yellow |
| 3. | Pentaerythritol tetrakis(3,4-dimethoxybenzoate) | 2 | 500 | sl. yellow |
| 4. | Pentaerythritol tetrakis(3,4-dimethoxybenzoate) | 3 | 400 | yellow |
| 5. | Pentaerythritol tetrakis(2,4-dimethoxybenzoate) | 1 | 300 | sl. yellow |
| 6. | 1,2-Bis(3,4-dimethoxybenzamido)benzene | 1 | 200 | yellow |
| 7. | Pentaerythritol tetrakis(3,5-dimethoxybenzoate) | 1 | 150 | yellow |
| 8. | Pentaerythritol tetrakis(3-methoxy-4-butoxybenzoate) | 1 | 150 | sl. yellow |
| 9. | Pentaerythritol tetrakis(3-methoxy-4-octoxybenzoate) | 1 | 100 | sl. yellow |
| 10. | Methyl-α-D-glucoside tetrakis(3,4-di-methoxybenzoate) | 1 | 175 | sl. yellow |
| 11. | Methyl 3,4-dimethoxybenzoate | 1 | 200 | sl. yellow |
| 12. | 1,1,1-Trimethylolethane tris(3,4-di-methoxybenzoate) | 1 | 100 | sl. yellow |
| 13. | PETV (0.3 phr DISDAP; 0.05 phr Irganox) | 1 | 300 | sl. yellow |
| 14. | PETV (0.15 phr DISDAP; 0.05 phr Irganox) | 1 | 200 | sl. yellow |
| 15. | PETV (0.2 phr DISDAP; 0.05 phr Irganox) | 1 | 200 | sl. yellow |
| 16. | beta (3,4-dimethoxybenzamido) ethyl veratrate | 1 | 200 | yellow |
| 17. | pentaerythritol tetra(2,4-methylenedioxybenzoate) | 1 | 300 | sl. yellow |
| 18. | 1,1,1-trimethylolpropane tris(3,4-methylenedioxybenzoate) | 1 | 200 | yellow |
| 19. | 1,1,1-trimethylolethane tris(3,4-methylenedioxybenzoate) | 1 | 200 | yellow |
| 20. | t-butyl veratrate | 1 | 200 | yellow |
| 21. | N,N'-(3,4-dimethoxybenzoyl) 1,2-cyclohexane diamine | 1 | 200 | yellow |

The Weather-Ometer tests described in connection with Exmaple XI were carried out with another series of ultraviolet light stabilizers and Profax 6501. Since it is impossible to reproduce conditions exactly in separate Weather-Ometer tests it is necessary to run a blank for comparison. The results in this second series of Weather-Ometer tests are set forth in Table III.

In tables, I, II and III unless otherwise indicated there was present in the polypropylene 0.15 parts of DISDAP and 0.05 parts of Irganox 1010.

The monolefin polymers and polyolefins polymers employed in the present invention are solids.

TABLE III
WEATHER-METER EVALUATION OF ULTRAVIOLET STABILIZERS IN POLYPROPYLENE PANELS

| No | Ultraviolet Stabilizer | Conc. in phr | Hours to Failure | Color at Failure |
|---|---|---|---|---|
| | UV Stabilizer Added - CONTROL | 0 | 100 | sl. yellow |
| 1. | Pentaerythritol tetra(3,4-dimethoxybenzoate) | 1 | 300 | sl. yellow |
| 2. | Pentaerythritol tetra(3,4-methylenedioxybenzoate) | 1 | 300 | sl. yellow |
| 3. | Methyl 2,4-dimethoxybenzoate (liquid) | 1 | 300 | brown |
| 4. | 1,2-Bis(3,4-dimethoxybenzamide)benzene | 1 | 200 | yellow |
| 5. | 1,1,1-Trimethylolpropane tris(3,4-methylenedioxybenzoate) | 1 | 200 | yellow |
| 6. | 1,1,1-Trimethylolethane tris(3,4-methylenedioxybenzoate) | 1 | 200 | yellow |
| 7. | t-butyl 3,4-dimethoxybenzoate (liquid) | 1 | 200 | yellow |
| 8. | N,N'-3,4-dimethoxybenzoly-1,2-cyclohexanediamine | 1 | 200 | yellow |
| 9. | beta-(3,4-dimethoxybenzamido) ethyl veratrate | 1 | 200 | yellow |
| 10. | 1,2-Cyclohexanediol diveratrate | 1 | 200 | sl. yellow |
| 11. | Pentaerythritol tetra(2,4-dimethoxybenzoate) | 1 | 175 | sl. yellow |
| 12. | Methyl-alpha-D-glucoside tetra (3,4-dimethoxybenzoate) | 1 | 150 | sl. yellow |

TABLE III-continued

WEATHER-METER EVALUATION OF ULTRAVIOLET STABILIZERS IN POLYPROPYLENE PANELS

| No | Ultraviolet Stabilizer | Conc. in phr | Hours to Failure | Color at Failure |
|---|---|---|---|---|
| 13. | N-octyl-3,4-dimethoxybenzamide | 1 | 150 | yellow |
| 14. | Pentaerythritol tetra(4-methoxybenzoate) | 1 | 150 | sl. yellow |

Using the procedure described in example 1 there were prepared ultra violet stabilizers as set forth in the following table.

TABLE IV

Preparation of Experimental Ultraviolet Stabilizers

| Exp. | Alcohol or Amine | | Acid Chloride | | Product | % Yield | °C. |
|---|---|---|---|---|---|---|---|
| 1 | pentaerythritol | 0.050 mole | 3,4-methylenedioxybenzoyl | 0.20 mole | pentaerythritol tetra(3,4-methylenedioxybenzoate) | 99 | m.p. 225–227 |
| 2 | pentaerythritol | 0.050 mole | 4-methoxybenzoyl | 0.20 mole | pentaerythritol tetra(4-methoxybenzoate) | 93 | 66.5–68 |
| 3 | pentaerythritol | 0.022 mole | p-dimethylaminobenzoyl | 0.088 mole | pentaerythritol tetra(p-dimethylaminobenzoate) | 41 | 204–206 |
| 4 | methyl-a-D-glucose | 0.025 mole | 3,4-dimethoxybenzoyl | 0.10 mole | methyl-a-D-glucose tetra(3,4dimethoxybenzoate) | 41 | 94–96 |
| 5 | glycerol | 0.033 mole | 3,4-dimethoxybenzoyl | 0.100 mole | glycerol tris(3,4-dimethoxybenzoate) | 67 | 120–121 |
| 6 | ethylene glycol | 0.05 mole | 3,4-dimethoxybenzoyl | 0.10 mole | ethylene-glycol bis (3,4-dimethoxybenzoate) | 80 | 113–114 |
| 7 | meso-erythritol | 0.025 mole | 3,4-dimethoxybenzoyl | 0.10 mole | meso-erythritol tetra (3,4-dimethoxybenzoate) | 85 | 158–159 |
| 8 | 1,2-dihydroxybenzene | 0.05 mole | 3,4-dimethoxybenzoyl | 0.10 mole | 1,2-Bis(3,4dimethoxybenzoxy) benzene | 87 | 161–163 |
| 9 | tert-butanol | 0.10 mole | 3,4-dimethoxybenzoyl | 0.10 mole | tert-butyl 3,4 dimethoxybenzoate | 30 | bp 121–125 |
| 10 | 2-aminoethanol | 0.050 mole | 3,4-dimethoxybenzoyl | 0.10 mole | 2-(3,4-dimethoxybenzamido) ethyl,3,4-dimethoxybenzoate | 72 | 135–136 |
| 11 | octylamine | 0.20 mole | 3,4-dimethoxybenzoyl | 0.20 mole | N-octyl-3,4-dimethoxybenzamide | 83 | 81–82 |
| 12 | 1,2-cyclohexanediol | 0.050 mole | 3,4-dimethoxybenzoyl | 0.10 mole | 1,2-cyclohexanediol Bis(3,4-dimethoxybenzoate) | 67 | 147–157 |
| 13 | 1,2-diaminocyclohexane | 0.05 mole | 3,4-dimethoxybenzoyl | 0.10 mole | N,N'-Bis(3,4-dimethoxybenzoyl)-1,2-diaminocyclohexane | 86 | 220–227 |
| 14 | 1,1,1-trimethylolpropane | 0.062 mole | 3,4-methylenedioxybenzoyl | 0.186 mole | 1,1,1-trimethylolpropane tris(3,4-methylenedioxybenzoate) | 89 | 90–93 |
| 15 | 1,1,1-trimethylolethane | 0.088 mole | 3,4-methylenedioxybenzoyl | 0.264 mole | 1,1,1-trimethylolethane tris (3,4-methylenedioxybenzoate) | 90 | 102–111 |

What is claimed is:

1. A compound having a formula

    I where R is alkoxyphenyl, dialkoxyphenyl or alkylene dioxyphenyl, the alkoxy groups having 1 to 8 carbon atoms, and the alkylene group having 1 to 4 carbon atoms, q is 1 to 6, Z is

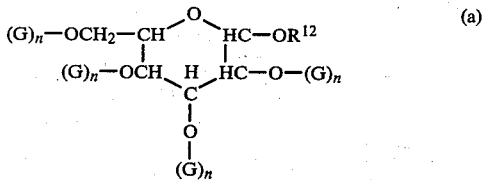

where $R^{12}$ is lower alkyl and G is H or

wherein $R^8$ is hydrocarbyl and where n is 0 or 1 and at least one of the n's must be zero;

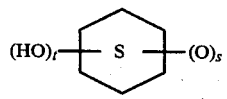

where s is 1 to 3 and t is from 1 to 2, the total of s and t being not over 3;

(c) 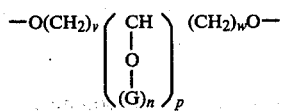

where v and w are each 1 to 4 and p is 2 to 4

(d) 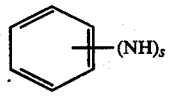

(e) 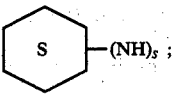

(f) 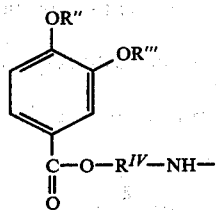

where R'' and R''' are 1 to 8 carbon atom alkyl or where R'' and R''' together with the oxygen atoms attached thereto and the adjacent carbon atoms of the benzene ring form a 5 to 6 membered heterocyclic ring and $R^{IV}$ is 1 to 4 carbon atom alkylene;

(g) 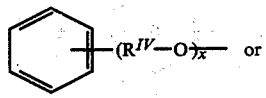 or

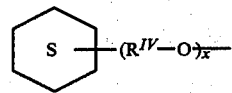

where x is 2 to 3;

(h) tertiary alkyloxy of 4 to 18 carbon atoms (i) 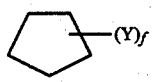

where Y is

—O—, —$R^6$—O— where $R^6$ is 1 to 3 carbon atoms,

, or

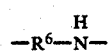

and f is 2 to 4.

2. A compund according to claim 1 wherein Z is (a).

3. A compound according to claim 1 wherein Z is (c).
4. A compound according to claim 1 wherein Z is (e).
5. A compound according to claim 4 wherein s is 2.
6. A compound according to claim 1 wherien Z is (d).
7. A compound according to claim 6 wherein s is 2.
8. A compound according to claim 1 wherein Z is (f).
9. A compound according to claim 8 wherein $R^{IV}$ is ethylene.
10. A compound according to claim 1 wherein Z is (g).
11. A compound according to claim 1 wherein Z is (h).
12. A compound according to claim 1 wherein Z is (a) and $R^{12}$ is methyl.
13. A compound according to claim 1 wherein Z is (i).
14. A compound having the formula

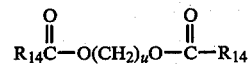

where $R_{14}$ is dialkoxyphenyl, the alkoxy groups having 1 to 8 carbon atoms and u is 2 to 4.

15. A compound according to claim 14 wherein the alkoxy groups are in the 3 and 4 position.
16. A compound according to claim 15 wherein $R_{14}$ is -3,4-dimethyoxyphenyl.
17. A compound according to claim 14 which is ethylene glycol di(3,4-dimethoxybenzoate), ethylene glycol di(2,4-dimethoxybenzoate), ethylene glycol di(3,5-dimethoxybenzoate), ethylenen glycol di(3-methoxy-4-octoxy-benzoate, propylene glycol di(3,4-dimethoxybenzoate), trimethylene glycol di(3,4-dimethoxybenzoate) or ethylene glycol di(3-methoxy-4-octoxy benzoate).
18. A compound according to claim 17 which is ethylene glycol di(3,4-dimethoxybenzoate).
19. A compound according to claim 17 which is ethylene glycol di(2,4-dimethoxybenzoate).
20. A compound according to claim 17 which is ethylene glycol di(3-methoxy-4-octoxybenzoate).
21. A compound according to claim 17 which is propyleneglycol di(3,4-dimethoxybenzoate).
22. A compound having the formula I

where R is alkoxyphenyl or dialkoxyphenyl, the alkoxy groups having 1 to 8 carbon atoms, q is 3 to 4, Z is

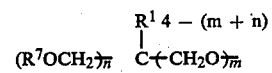

where $R^1$ is a 1 to 4 carbon atom alkyl, $R^7$ is hydrogen of

where $R^8$ is an alkyl or 1 to 17 carbon atoms or phenyl or $$\overset{O}{\underset{\|}{C}}R^8$$

is oleoyl, m is 3 to 4, n is 0 or 1 and m+n is 3 to 4.

23. A compound according to claim 22 wherein the compound of formula I is an ester of pentaerythritol and q is 3 to 4.

24. A compound according to claim 23 wherein q is 4.

25. A compound according to claim 23 wherein m is 3 and $R^7$ is $$-\overset{O}{\underset{\|}{C}}R^8$$

and $R^8$ is an alkyl of 1 to 17 carbon atoms.

26. A compound according to claim 23 wherein the ester is penaerythritol tetraveratrate.

27. A compound according to claim 22 wherein the compound of formula I is an ester of trimethylol alkane having 2 to 3 carbon atoms in the alkane group and wherein m is 3.

28. A compound according to claim 22 where when R is alkoxyphenyl it is 4-alkoxyphenyl.

29. A compound according to claim 22 wherein R is dialkoxyphenyl.

30. A compound according to claim 29 wherein R is 2,4-dialkoxyphenyl, 3,4-dialkoxyphenyl or 3,5-dialkoxyphenyl.

31. A compound according to claim 29 where m+n is 3.

32. A compound according to claim 29 wherein the compound of formula I is a veratrate of a trimethylolalkane having 2 to 3 carbon atoms in the alkane group.

33. A compound according to claim 29 wherein the compound of formula I is a veratrate of pentaerythritol.

34. A compound according to claim 29 wherein m is 3 and n is 1 and $R^7$ is $$\overset{O}{\underset{\|}{C}}R^8$$

and $R^8$ is an alkyl of 1 to 17 carbon atoms.

35. A compound according to claim 29 which is an ester of a trimethylolalkane having 2 to 3 carbon atoms in the alkane group, m+n is 3, n is 1, $R^7$ is $$\overset{O}{\underset{\|}{C}}R^8$$

and $R^8$ is alkyl of 1 to 17 carbon atoms.

36. A compound according to claim 29 wherein both alkoxy groups are methoxy.

37. A compound according to claim 36 where m+n is 3.

38. A compound according to claim 36 where m+n is 4.

39. A compound according to claim 29 wherein R is -3,4-dialkoxyphenyl.

40. A compound having the formula $$(R-\overset{O}{\underset{\|}{C}})_q Z$$

where R is alkoxyphenyl, dialkoxyphenyl or alkylene dioxyphenyl, the alkoxy groups have 1 to 8 carbon atoms, and the alkylene group having 1 to 4 carbon atoms, q is 2 to 3, Z is

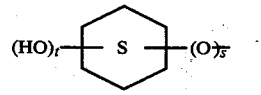

where s is 2 to 3 and t is 0 to 1, the total of s and t being not over 3.

* * * * *